US009123051B2

(12) United States Patent
Chen

(10) Patent No.: US 9,123,051 B2
(45) Date of Patent: Sep. 1, 2015

(54) METHOD AND SYSTEM OF CONVERTING A GENERIC TOOL AND CUSTOMER SERVICE SYSTEM INTO A SPECIFIC TOOL AND SPECIFIC CUSTOMER SERVICE SYSTEM

(75) Inventor: Ieon Chen, Laguna Hills, CA (US)

(73) Assignee: Innova Electronics, Inc., Irvine, CA (US)

( * ) Notice: Subject to any disclaimer, the term of this patent is extended or adjusted under 35 U.S.C. 154(b) by 959 days.

(21) Appl. No.: 12/768,630

(22) Filed: Apr. 27, 2010

(65) Prior Publication Data

US 2011/0264322 A1    Oct. 27, 2011

(51) Int. Cl.
| | |
|---|---|
| G06F 17/00 | (2006.01) |
| G06Q 30/02 | (2012.01) |
| G06Q 99/00 | (2006.01) |
| G06Q 30/00 | (2012.01) |
| G06Q 30/06 | (2012.01) |

(52) U.S. Cl.
CPC .............. *G06Q 30/02* (2013.01); *G06Q 30/016* (2013.01); *G06Q 30/0641* (2013.01); *G06Q 99/00* (2013.01)

(58) Field of Classification Search
CPC ................................ G07C 5/008; G06Q 99/00
USPC .............. 701/31.5, 34.4, 34.2; 705/7.11, 304, 705/500, 902
See application file for complete search history.

(56) References Cited

U.S. PATENT DOCUMENTS

| | | | |
|---|---|---|---|
| D334,560 S | 4/1993 | Wilson | |
| D377,622 S | 1/1997 | Chen et al. | |
| 5,635,841 A | 6/1997 | Taylor | |
| 5,767,681 A | 6/1998 | Huang | |
| 6,000,413 A | 12/1999 | Chen | |
| 6,499,385 B2 | 12/2002 | Protti | |
| 6,687,584 B2 | 2/2004 | Andreasen et al. | |
| 6,868,369 B2 | 3/2005 | Huang et al. | |
| 6,940,270 B2 | 9/2005 | Chen | |
| 6,941,203 B2 | 9/2005 | Chen | |
| 6,947,816 B2 | 9/2005 | Chen | |
| D510,287 S | 10/2005 | Chen et al. | |
| 6,968,733 B2 | 11/2005 | Andreasen et al. | |
| 7,030,742 B2 | 4/2006 | Treadway | |
| 7,085,680 B2 | 8/2006 | Huang | |
| 7,116,216 B2 | 10/2006 | Andreasen et al. | |
| RE39,619 E | 5/2007 | Andreasen et al. | |
| D545,223 S | 6/2007 | Chen | |
| D558,621 S | 1/2008 | Rich et al. | |
| D559,137 S | 1/2008 | Protti | |
| D560,129 S | 1/2008 | Rich et al. | |
| D560,527 S | 1/2008 | Rich et al. | |
| 7,325,775 B2 | 2/2008 | Chen | |
| D563,249 S | 3/2008 | Chen | |

(Continued)

*Primary Examiner* — Hunter Wilder
(74) *Attorney, Agent, or Firm* — Stetina Brunda Garred & Brucker

(57) ABSTRACT

Provided is a method for converting a generic system into a specifically-branded system after the sale of an item. The method alleviates a supplier's inventory burdens by allowing the supplier to inventory generic items, rather than items specifically branded for a particular retailer. The items may be branded with the selling retailer's logo or indicia after the sale of the item. Furthermore, the item may be associated with a customer service system, which may also be branded with the selling retailer's logo after the sale of the item. The conversion of the item and customer service system from a generic item and system into a specifically-branded item and system may foster the relationship between the supplier and retailer and entice the retailer to maintain the relationship with the supplier.

32 Claims, 5 Drawing Sheets

(56) References Cited

U.S. PATENT DOCUMENTS

| | | |
|---|---|---|
| D569,280 S | 5/2008 | Chen |
| 7,376,497 B2 | 5/2008 | Chen |
| D571,241 S | 6/2008 | Andreasen et al. |
| 7,437,227 B2 | 10/2008 | Andreasen et al. |
| D581,822 S | 12/2008 | Madison et al. |
| 7,464,000 B2 | 12/2008 | Huang |
| D590,387 S | 4/2009 | Chen |
| 7,520,668 B2 | 4/2009 | Chen |
| RE40,798 E | 6/2009 | Chen |
| RE40,799 E | 6/2009 | Chen |
| 7,603,293 B2 | 10/2009 | Chenn |
| D610,586 S | 2/2010 | Chen |
| 8,024,083 B2 * | 9/2011 | Chenn .......................... 701/31.5 |
| 8,098,140 B1 * | 1/2012 | Escobosa et al. .......... 340/12.28 |
| 2005/0033664 A1 * | 2/2005 | Moon et al. .................... 705/27 |
| 2006/0236704 A1 * | 10/2006 | Valcavi et al. ................... 62/129 |
| 2006/0247978 A1 * | 11/2006 | Davis .............................. 705/26 |
| 2006/0293811 A1 | 12/2006 | Andreasen et al. |
| 2007/0005201 A1 * | 1/2007 | Chenn ............................ 701/29 |
| 2007/0124040 A1 | 5/2007 | Chen |
| 2008/0119981 A1 | 5/2008 | Chen |
| 2009/0006476 A1 | 1/2009 | Andreasen et al. |
| 2009/0061840 A1 * | 3/2009 | Fleischman et al. .......... 455/419 |
| 2009/0150218 A1 * | 6/2009 | Brunner et al. ................. 705/10 |
| 2009/0276115 A1 | 11/2009 | Chen |
| 2010/0005010 A1 | 1/2010 | Chenn |
| 2010/0042510 A1 * | 2/2010 | Zeinfeld et al. ................. 705/26 |
| 2010/0124913 A1 * | 5/2010 | Cox ........................... 455/414.2 |
| 2010/0174661 A1 * | 7/2010 | Kaskoun et al. .............. 705/318 |
| 2010/0222047 A1 * | 9/2010 | Vanderlinden et al. ....... 455/418 |
| 2010/0302027 A1 * | 12/2010 | Gold ............................ 340/539.2 |
| 2011/0178831 A1 * | 7/2011 | Ravichandran .............. 705/7.11 |
| 2011/0238506 A1 * | 9/2011 | Perkowski et al. ........ 705/14.73 |

* cited by examiner

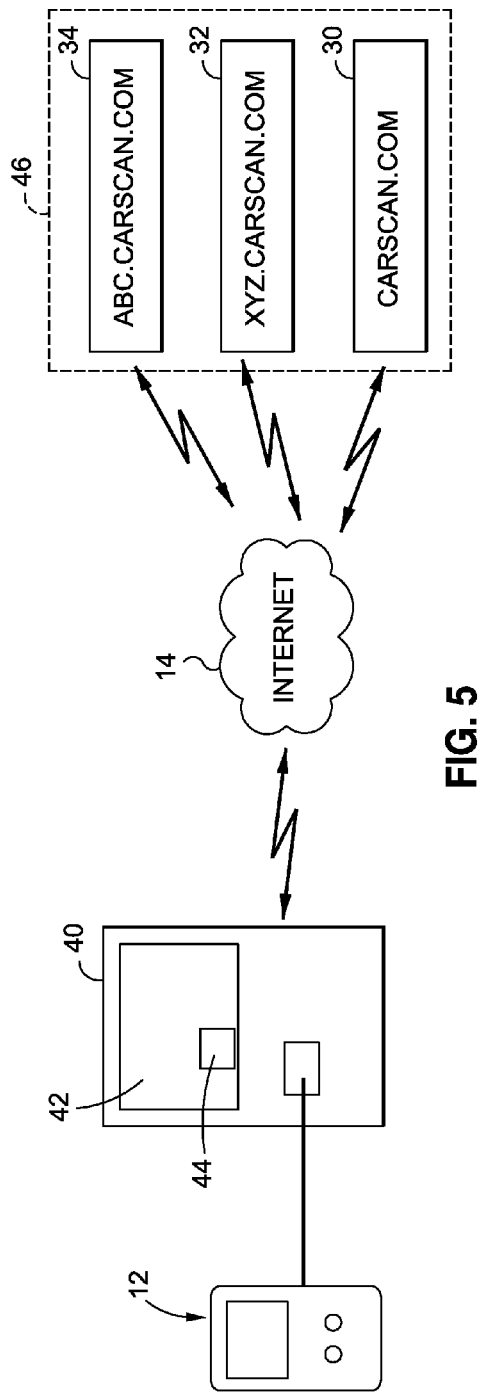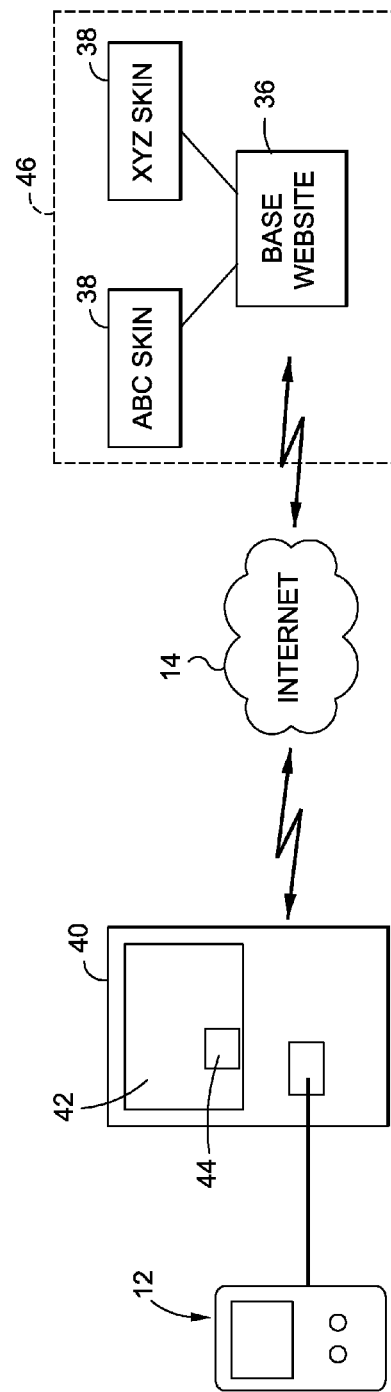

METHOD AND SYSTEM OF CONVERTING A GENERIC TOOL AND CUSTOMER SERVICE SYSTEM INTO A SPECIFIC TOOL AND SPECIFIC CUSTOMER SERVICE SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates generally to an inventory management and customer support method, and more specifically to a method and system of converting a generic customer service system into a specifically-branded customer service system.

Today's marketplace is generally considered to be dynamic, meaning that it routinely changes and evolves. New companies regularly enter the marketplace, while other companies experience failure and eventually terminate their operations. The changes to the marketplace may be prompted by a variety of factors, including technological advances, changes in economic conditions, or other competitive causes. Given the constantly changing landscape in the marketplace, it is important for most businesses to monitor the marketplace and respond accordingly.

Businesses have long been concerned with finding ways to increase sales, reduce overhead, provide greater customer value to their products and enhance customer loyalty. Balancing those goals in highly competitive marketplaces require foresight, adaptability, innovation, and responsiveness to customer needs.

Maintaining proper inventory requires that a company have sufficient inventory available to meet customer demands, while limiting overstock to avoid unnecessary storage costs. Excess unsold inventory may ultimately need to be discarded, or sold at some substantially reduced price. The problems associated with such excess inventory are particularly significant where products are private labeled for a particular customer. While such private labeling may be useful to increase customer satisfaction and customer loyalty, such private label merchandise can typically only be sold to a single customer, in its original condition. While such products can potentially be modified for resale with a different "skin", such modifications are typically expensive, time consuming and may leave little profit from sales of the articles.

As such, businesses are continually searching for ways to make products more attractive to their customers, enhance the value of the products to the customers, while at the same time enhancing a supplier's sales and increasing its inventory flexibility. The present invention is directed to a method and system which achieves these and other goals and objectives primarily with respect to automotive tools marketed through various private label retailers. The invention described herein allows a supplier to provide retailers with private label automotive tools that are useful for automotive diagnostic functions, with certain of the functions being implemented via websites which can be customized to incorporate the identity of the retailer, and offer custom functions selected by the retailer, while allowing the tool to be of a more generic construction. Among the functions the website may offer are custom retailing and advertising functions which may be linked to the private label customer's own website, to provide additional value to the private label retailer. Third party advertising and retail sales functions may also be implemented via the private label customizable website, which can provide further revenue and value to the private label customer, with little or no cost or drain upon any resources of the private label customer. As such, the invention allows a private label supplier to offer tools that can be customized to the needs and preferences of retailers with little or no physical modifications that would minimize unique inventory requirements. Further, the system provides a readily customizable website that enhances the value to the customer, enhances additional sales and profits to the retailer and promotes retailer loyalty to the tool supplier. The unique combination of system components and business functions thereby provides advantages to both the supplier and private label retailer, which are described in further detail below.

BRIEF SUMMARY

There is provided a method for converting a generic system into a specifically-branded system after the sale of an item. The method alleviates a supplier's inventory burdens by allowing the supplier to inventory generic devices which can be sold to a plurality of private label retailers in the same, or substantially the same physical form. The devices may be associated with a unique customer service website associated with a specific private label retailer. The customer service website may be a branded implementation of a website operated by the supplier to support functionality of the device and to allow for customer access to ancillary information, products and services. The conversion of the device and customer service system from a generic device and system into a specifically-branded device and system may be implemented with little or no hardware changes. Further, the cost of the customer service website may be distributed over similar, different branded products marketed by the supplier, allowing the supplier to provide enhanced product functionality at a lower cost to the retailer, thereby fostering the relationship between the supplier and retailer. Moreover, the prospect of sharing in additional, ongoing revenue from advertising and sales on the website further enhances advantages to both the supplier and the retailer, further promoting an ongoing customer relationship.

According to one embodiment, the method includes a step of providing an electronic device for sale by at least one retailer, and providing a customer service website associated with the electronic device. Software may also be provided with the electronic device, or within the electronic device, to configure a computer to interface the electronic device to a customer service website on the World Wide Web. The electronic device, associated software, and/or the customer service website is initially configured to allow the customer to select identification indicia associated with the retailer from which the electronic device was purchased. After the retailer is selected, the system operates to retain the selling retailer association with the electronic device, and to display identification indicia associated with the selling retailer. In future use the electronic device and/or the customer service website will display indicia associated with the selling retailer without the need for repeated selection by the end user.

The website may be functionally duplicated for each private label retailer selling the electronic device. Another website may be provided for the supplier, to support the supplier's sales of similar products under its own brand.

In an alternate implementation the system and method may operate using a single website, having alternate skins that correspond to each selling retailer. The skin selection may proceed as indicated above. Whether a single website or multiple websites are used to implement the invention, the basic functionality of the website may remain the same, subject to the selection of customizing features, such as links to the selling retailer's primary website and links enabling the sale of third party goods or services by the end user.

Another implementation may incorporate the use of a kiosk to interface the electronic device with a local database, or a remote database (private label or supplier branded) accessible by the World Wide Web. Again, the display on the electronic device and/or kiosk screen may be customized in the manner described above. In each implementation the customized display may allow an end user to purchase additional products or services.

The system and method allow the selling retailer and supplier to allocate income derived from such additional products or services, such that the supplier and selling retailer may each benefit from such purchases. For example, where the end user desires to purchase additional diagnostic services provided by the supplier, the user may be linked to the supplier's website (which may or may not be supplier branded), and the selling retailer may receive some payment or commission from that purchase. Similarly, where the user desires to purchase some further product or service from the retailer, e.g. a replacement part and/or repair service, the user may be linked to the selling retailer's own website, and the supplier may receive some payment or commission for such linkage and/or purchase. The supplier and selling retailer may also share in income derived from third party advertising as well as the links to purchase of products or services from third party retailers. The supplier and selling retailer may similarly share in proceeds of third party paid adverting on a website or kiosk.

Accordingly, the present invention provides a system and methodology that facilitates the sale and operation of private label electronic device using a database that may be external to the electronic device itself. The electronic device and/or an associated display on a remote website or kiosk may be customized to reinforce the brand of the selling retailer or supplier. The display features may further be customized to allow for additional commercial activity that provides additional economic benefits to the supplier and selling retailer. Moreover, the use of an electronic device that is either identical or substantially similar to those sold under multiple brands reduces the need for a supplier to maintain large inventories of electronic devices uniquely associated with a single private label retailer, while allowing the product to operate in a manner that uniquely identifies an individual selling retailer.

The method may further include providing an electronic device having a digital display that may be configured to display the selling retailer logo or indicia after the sale of the electronic device.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 5 is a schematic diagram of a first embodiment of a kiosk based system of branding a customer service system after the sale of an electronic device; and FIG. 6 is a schematic diagram of a second embodiment of a kiosk based system of branding a customer service system after the sale of an electronic device.

DETAILED DESCRIPTION

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
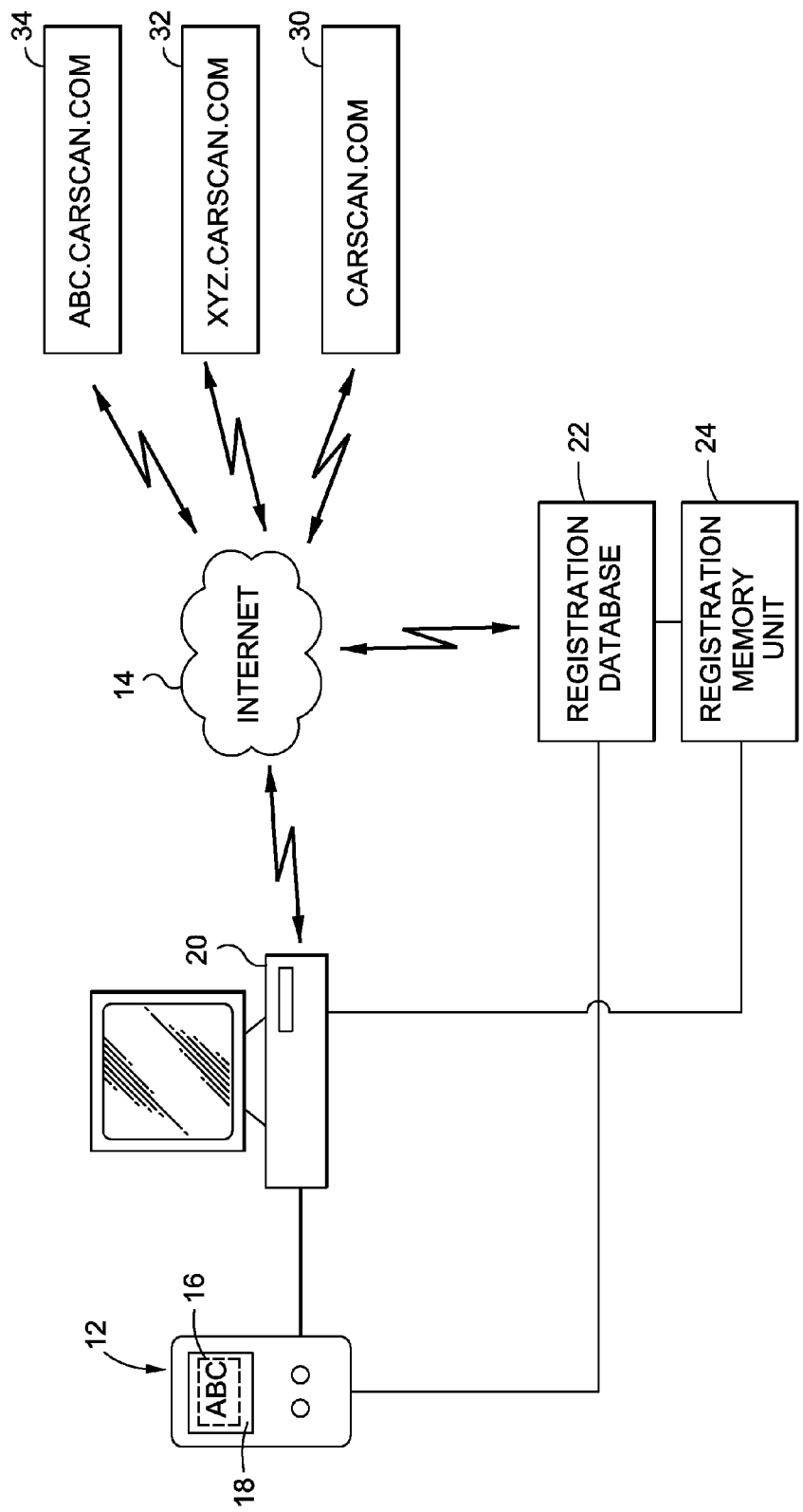
FIG. 1 is a schematic diagram of a first embodiment of a system of branding a customer service system after the sale of an electronic device.

Referring now to FIG. 1 of the drawings, there is depicted a method and system of converting a generic customer service website into a specific customer service system associated with a selling retailer after the sale of an electronic device 12. The supplier of the electronic device 12 may offer a customer service website which compliments the electronic device 12. An exemplary electronic device 42 is an automotive scan too (i.e., electronic device) which retrieves Diagnostic Trouble Codes hum a vehicle. The supplier of the automotive scan tool may offer a diagnostic analysis service to the consumer of the automotive scan tool for interpreting the Diagnostic Trouble Codes downloaded from the vehicle. The method and system may be used to brand the electronic device 12 and/or the customer service website with a graphic interface, i.e., retailer indicia or logos, after the sale of the electronic device 12. Therefore, when a retailer consumer uses the device 12 and the customer service website, the selling retailer logo may appear on the device 12 or the customer service website.

The retailer may benefit from the method and system because of an increased exposure of the retailer's logo and branding to the retailer consumer, which may strengthen the retailer-consumer relationship. In addition, downstream revenues may be generated from sales of related goods and services offered by the retailer, as described in more detail below.

The supplier may benefit from the method and system by creating the above-mentioned benefits for the retailers. When the retailers benefit from the method and system, the retailer will be encouraged to continue dealing with the supplier, and as such, the relationship between the supplier and retailer will be strengthened. The method and system may also mitigate inventory management burdens for the supplier. Traditionally, the supplier would keep an inventory of specifically branded devices for sale by respective retailers. For instance, the supplier may offer a model X device, which may be offered for sale by ABC retailer and XYZ retailer. The supplier may have inventory of an ABC branded model X device, and an XYZ branded model X device for sale by the respective retailers. The method described herein may be used to allow the supplier to inventory a generic, or substantially generic device (i.e., one that may be sold by ABC retailer or XYZ retailer), and branded with the respective retailer logo or indicia after the sale of the device. As such, even where product is initially intended to be sold to one retailer, the product can be sold to another retailer, e.g. in the case of overstock or returns, with little or no change to the product.

A general description of one embodiment of the method is as follows. A supplier produces a generic electronic device 12 for sale by a plurality of retailers. The supplier receives an order from one of the retailers, and ships the electronic device 12 to the retailer. The electronic device 12 is adapted for use with a customer support website, which may be accessed via the Internet 14, or through other similar network communication means. A retail customer, i.e. end user, purchases the electronic device 12 from the selling retailer and completes a registration process which brands the electronic device 12 and/or customer service website with the selling retailer's graphic interface 16, which may include indicia or logos. For instance, the logo 16 of the selling retailer may be displayed on a customer service website (i.e., a private label website) associated with the selling retailer. As used herein, the selling retailer is the respective one of the plurality of retailers that purchases the device 12 from the supplier. Therefore, the registration step customizes the operation and appearance of the electronic device 12 and/or the website to make them private label retailer specific. The registration process need only be implemented during the initial use of the electronic device 12. In future use the electronic device 12 will automatically display the selling retailer's graphic interface without the need for any identification of the selling retailer. With the basics of the method being described above, the following provides a more detailed description of the method.

The method is initiated by connecting the electronic device 12 to a computer 20, either through wired communication or wireless communication. For wired communication, a cable may be used to connect the electronic device 12 to the computer 20 (i.e., through a USB port). To achieve wireless communication, the electronic device 12 and computer 20 may be equipped with a wireless communication device capable of BLUETOOTH communication, RF communication, infrared communication, or other wireless communication known by those skilled in the art.

After the communication link between the electronic device 12 and the computer 20 has been established, a registration process may be commenced. A registration program may run on the computer 20 to guide the retailer's customer through the registration process. In one embodiment, the registration program, i.e., software, may be packaged and sold with the electronic device 12 (e.g., on a separate disk), and may be installed on the computer after the sale of the device 12. In another embodiment, the registration program may be stored within a memory unit on the electronic device 12 and downloaded from the electronic device 12 to the computer 20 upon initial connection of the electronic device 12 to the computer 20. In yet another implementation, the registration program may be accessible for download from the Internet 14 front a registration website.

The registration program guides the retailer customer through a registration process to correlate the electronic device 12 with the selling retailer's private label website. The retailer's customer is asked to enter retailer data, such as the name of the selling retailer or a code associated with the selling retailer, into a field displayed on the computer 20 or on the device 12. Alternatively, the computer 20, website, or device 12 may display a drop-down list from which the retailer customer may select the selling retailer. The retailer data entered by the retailer customer is matched with data contained within a registration database 22. The registration database 22 includes a plurality of retailers and the electronic addresses (i.e., websites) associated with each retailer. The registration database 22 may be downloaded onto the computer 20 with the registration program, as discussed above. The retailer data received from the retailer's customer is cross-referenced with the data contained within the registration database 22, to determine the selling retailer website associated with the electronic device 12.

The selling retailer website address is stored in a registration memory unit 24 along with a unique electronic I.D. associated with the electronic device 12. The registration memory unit 24 may be located within the computer 20 (i.e., on the computer's 20 hard drive) and accessed when the device 12 is connected to the computer 20. Alternatively, the registration memory unit 24 may be located on the device 12 (e.g., on the device's hard drive) and accessed upon connection of the device 12 to the computer 20. In another embodiment, the registration memory unit 24 is located remotely from the computer 20 and the device 12. For instance, the registration memory unit 24 may be stored on a website accessible via the Internet upon connection of the device 12 to the computer 20.

Upon subsequent connection of the electronic device 12 to the computer 20, an initiation signal containing the unique electronic I.D. is sent from the electronic toot 12 to the registration memory unit 24. When the initiation signal is received by the registration memory unit 24, the unique electronic I.D. is matched with the data stored in the registration memory unit 24 to retrieve the selling retailer website. The computer 20 may be programmed to automatically launch the selling retailer's website upon retrieval thereof, or to prompt the retailer customer as to whether the selling retailer website should be launched. As such, the registration process need be implemented only a single time. When the electronic device 12 is again used, the graphical interface associated with the selling retailer may be automatically displayed on the electronic device 12, or any associated computer or kiosk. Similarly, the user would automatically be directed to a website having a graphic interface identifying the selling retailer which was previously selected.

In an alternative implementation of the present invention, identification of the selling retailer may be implemented without input from the end user. In one such embodiment, the supplier may note the serial number or other identification information of electronic devices 12 being shipped to a particular selling retailer, e.g. by scanning bar codes on shipment boxes which can be correlated to specific electronic devices 12. Data correlating the selling retailer with the specific electronic devices 12 can then be loaded to a server supporting a generic website accessible by the electronic device 12 or supporting software. Upon accessing the website the specific electronic device 12 may be identified, (e.g. by serial number included in the data stream), and correlated to a particular selling retailer, causing launch of the graphic interface associated with that selling retailer independent of input from the end user.

In yet another embodiment, information specifically identifying the selling retailer may be embedded in the electronic device 12, or an accompanying program disk, prior to sale. That information can operate to direct an initial linkage to the selling retailer's private label website. Alternatively, the information may be uploaded to a generic website that operates to display the selling retailer's identification on a private label graphic interface, or on a dedicated private label website associated with the selling retailer.

As noted above, the registration process may also be used to brand the electronic device 12 with the selling retailer logos or indicia. It is contemplated that the electronic device 12 may include a digital display 18 (see FIGS. 1 and 2) for displaying data to a user. A digital file including the selling retailer's logo may be downloaded from the computer 20 to the electronic device 12 for depiction on the digital display 18. The digital file may be downloaded from a website once the selling retailer is identified. Alternatively, the retailer logo may be included in the registration program downloaded onto the computer 20.

Given that the customer service system may be associated with a plurality of retailers, the architecture of the customer service system may be structured to facilitate the initial set-up of the customer service website, as well as the operation of the customer service website. In one embodiment, and referring specifically to FIGS. 1 and 3, the customer service website may be set up such that each selling retailer is associated with a separate website (i.e., carscan.com 30, xyz.carscan.com 32, abc.carscan.com 34). Each website may include the various databases and tools needed to complete the customer service functions associated with the electronic device 12, as may be selected by each private label retailer. The main distinction between the various websites may be the appearance thereof. The appearance of the XYZ.carscan.com website 32 may appear as an XYZ retailer website, and the ABC.carscan.com website 34 may appear as an ABC retailer website which is separate and distinct from the XYZ retailer website. The websites may also be distinguishable in the functions which they perform. For instance, one website may offer higher level functionality than others, which is described in more detail below.

Figure 2:
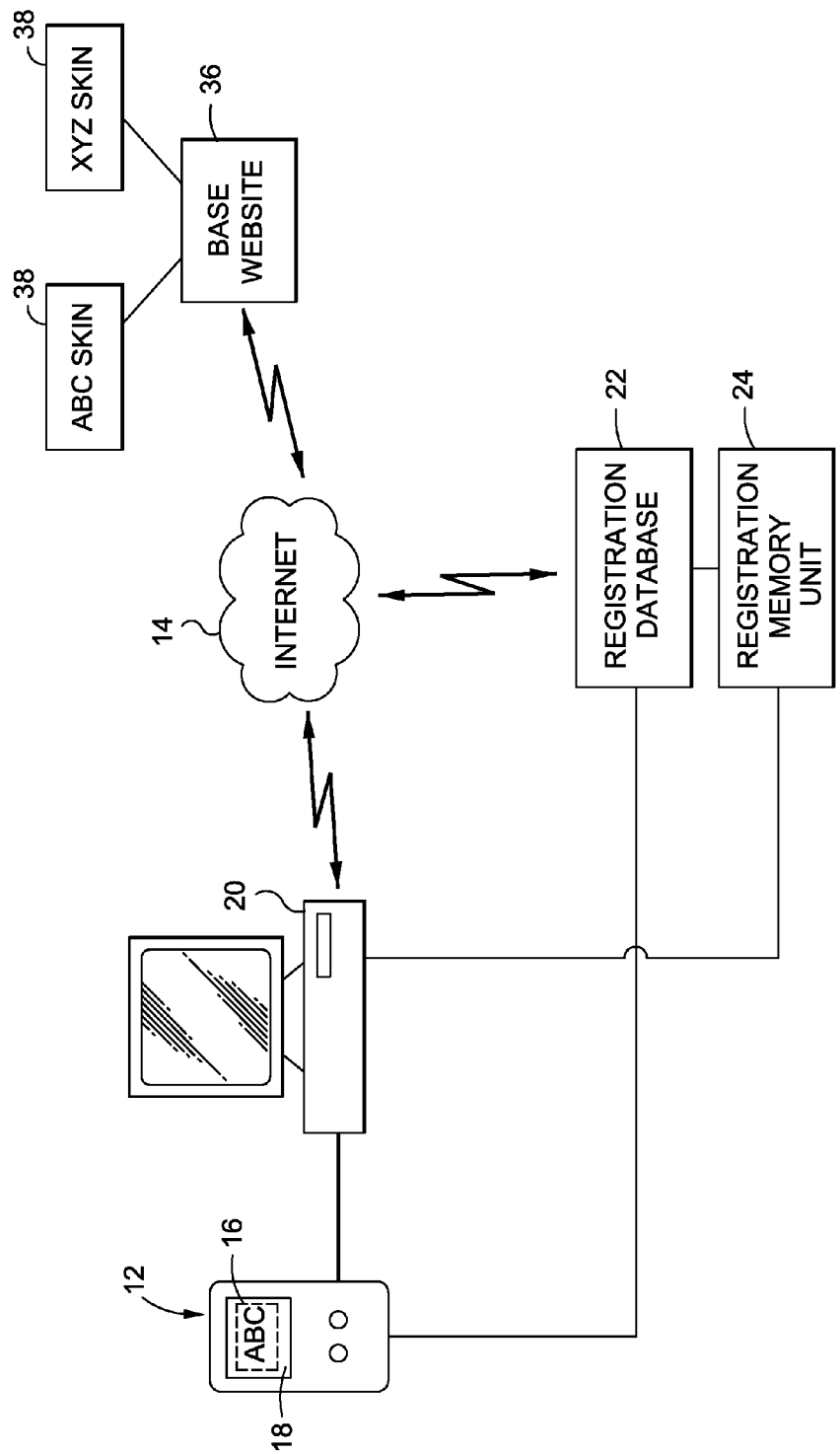
FIG. 2 is a schematic diagram of a second embodiment of a system of branding a customer service system after the sale of an electronic device.
Figure 4:
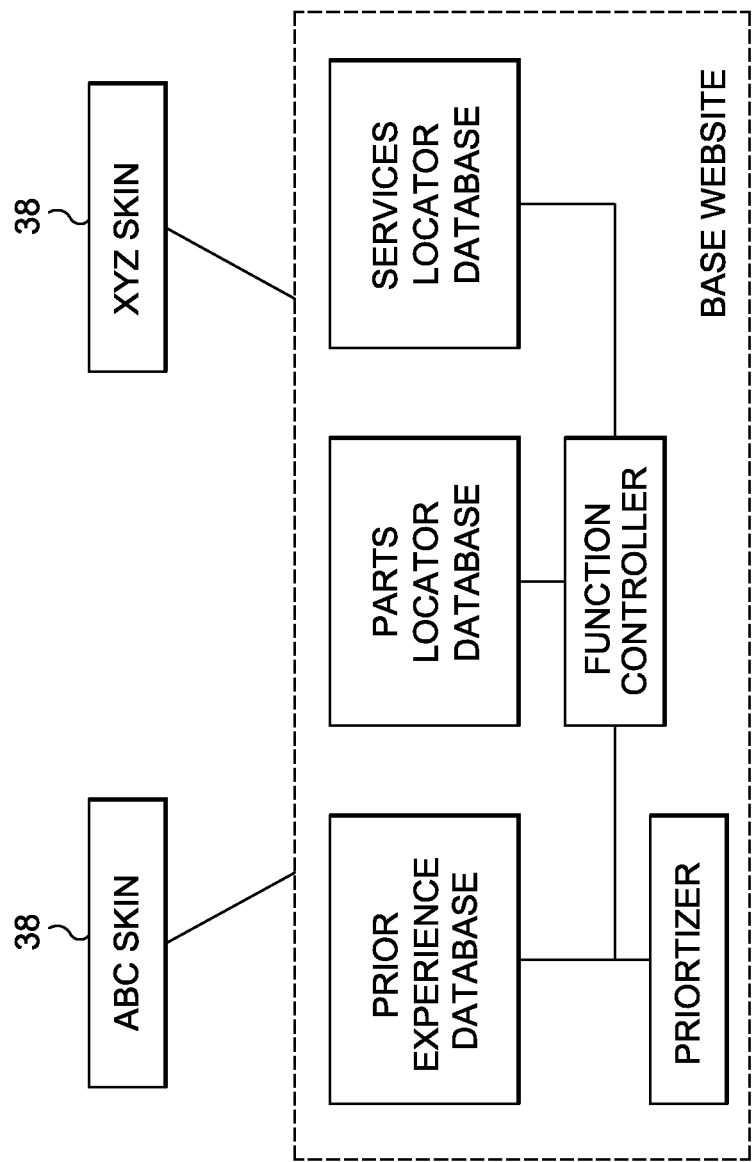
FIG. 4 is a schematic diagram of a base website having a plurality of skins for use with the customer service system depicted in FIG. 2.

According to another embodiment, and referring now specifically to FIGS. 2 and 4, the customer service system may be structured such that the customer service website includes include a single, base website 36 which hosts the various selling retailer websites. The base website 36 may have a plurality of portals, graphic interfaces, or "skins" 38 associated with the base website 36 to adapt the base website 36 to display logos and other indicia associated with the selling retailer. The portals or "skins" 38 may also adapt the functionality of the base website 36 to the specific desires of the selling retailer. Each portal or skin 38 may include a distinctive electronic address or website associated therewith (i.e., XYZ.carscan.com or ABC.carscan.com). The base website 36 may be configured to allow the respective selling retailers to modify and tailor the appearance of their selling retailer website as they desire. In this regard, the XYZ skin gives the base website 36 the appearance of being an XYZ website, while the ABC portal gives the website the appearance of being an ABC website. Therefore, the appearance of each website may be distinguishable, and associated with the respective selling retailers.

Figure 3:
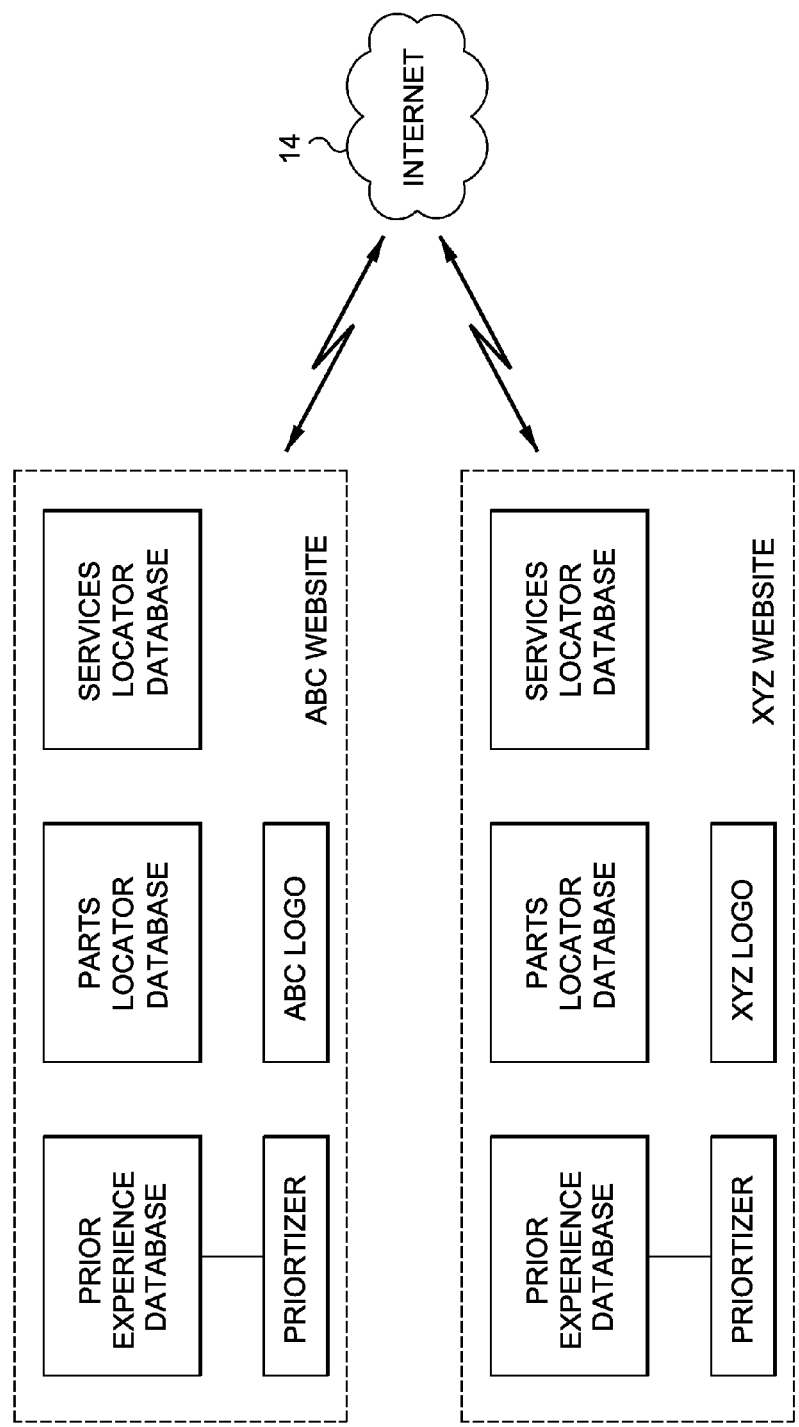
FIG. 3 is a schematic diagram of the websites included in the customer service system depicted in FIG. 1.

The base website 36 may include all of the databases and tools required to perform the customer service functions associated with the electronic device 12. In other words, the system depicted in FIGS. 2 and 4 is distinguishable from the system in FIGS. 1 and 3 in that all of the functional databases and tools are located at a single location (i.e., the base website 36), whereas the functional database and tools for the system depicted in FIGS. 1 and 3 are substantially copied and reproduced for each website. The system depicted in FIG. 2 may additionally be configured to allow each selling retailer to modify and tailor the functionality accessible to its customers. Therefore, an XYZ customer may have access to functionality that differs from an ABC customer.

As mentioned above, each selling retailer may tailor their respective private label website to offer different options and functionality to the retailer customers. For example, in relation to the automotive scan tool and diagnostic analysis system mentioned above, a private label website may be set up for each retailer of the automotive scan tool. One selling retailer may offer very basic diagnostic functionality at its private label website, wherein diagnostic trouble codes are merely interpreted for the retailer customer. In a higher level system, the retailer's private label website may offer an analysis of the diagnostic trouble codes to produce a most likely fix associated with the trouble codes. The websites many also show repair schematics and videos to the user. For a more detailed discussion of one technique for deriving the most likely fix, please see U.S. patent application Ser. No. 11/821,757, entitled Automotive Diagnostic and Remedial Process, filed on Jun. 28, 2007, owned by Innova Electronics Corp., of Fountain Valley, Calif., the disclosure of which is incorporated herein by reference. In addition, for a more detailed discussion related to the various options and functions that may be offered by each website, please see U.S. patent application Ser. No. 12/616,080, entitled A Method and Apparatus for Interfacing an Automotive Diagnostic Tool with a Diagnostic Database, filed on Nov. 10, 2009, owned by Innova Electronics Corp., of Fountain Valley, Calif., the disclosure of which is also incorporated herein by reference.

According to another aspect of the present invention, the retailers may use the private label websites as a means of generating additional revenues and providing additional resources to the end user. The supplier or retailers may charge consumers for access to some of the above-mentioned options and functionality available on their private label website. The fees generated from the private label website may be shared between the supplier and the selling retailer (i.e., 15% supplier, 85% selling retailer). For instance, a basic interpretation of the Diagnostic Trouble Codes may be available at no cost to the end user, whereas a more detailed diagnosis and other repair information (i.e., repair video/schematics) may be available for a fee. An accounting of the revenues generated from the private label website may be performed on a daily, weekly, monthly, or yearly basis, as agreed upon by the selling retailer and the supplier.

Revenues may also be generated by offering repair parts/services/information on the private label website. For instance, when the diagnosis identifies a problem with the vehicle, the website may direct the user to the primary website of the private label retailer, where the user can purchase parts of services associated with the necessary repairs. Revenues derived from the sales of repair parts and services may also be shared between the selling retailer and the supplier, e.g. on a fixed monthly, percentage or per click basis. In this manner, the private label website may advantageously generate more traffic to the selling retailer's main website.

In addition to offering repair parts and services by the selling retailer, the private label websites may offer third party repair parts and services. For instance, the websites may be able to locate repair parts and services within a particular radius. Therefore, if a vehicle driven by an end user breaks down and needs repair parts and services, the private label websites may be able to offer a list of third party retailers within the area which offer the needed parts and repair services. Similarly, if the selling retailer does not offer the parts and services required to fix the problem, the consumer may be presented with a list of third parties offering the parts and services. The third party may pay a fee to the selling retailer and the supplier for directing the consumer to the third party.

The above-described embodiment of the customer service system is a website-based system, wherein each retailer is provided with a private label website. In this manner, the retailer consumers generally interact with the website via a computer 20, PDA, smartphone, or other web-accessible accessories known by those skilled in the art. However, it is contemplated that other implementations of the customer service system may be provided which are not website-based systems. Referring now specifically to FIGS. 5 and 6, there is depicted a kiosk-based system which includes generic kiosks 40 which may display a particular graphic interface in response to input from a kiosk user. The kiosk 40 may be used by consumers of various retailers, and the graphic interface of the particular selling retailer would be displayed after the consumer entered vendor data.

The kiosks 40 include a display 42 and a user interface 44 (such as a touch screen). The kiosks 40 may access a database 46 having the various graphic interfaces and functions associated with the various retailers. The embodiment shown in FIG. 5 is similar to the computer based system shown in FIG. 1, while the embodiment depicted in FIG. 6 is similar to the system shown in FIG. 2.

The kiosks 40 may be used in relation to the vehicle diagnostic system described above, wherein kiosks 40 may be placed in easy to reach locations (i.e., gas stations, shopping centers, parking garages, etc.) for users to access diagnostic services. For instance, vehicle diagnostic data may be communicated between the kiosk 40 and the device 12. The kiosk system may also be used in other industries, such as airline check-in, movie rental, banking, etc.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of associating a specific private label retailer with an electronic automotive diagnostic device sold by a plurality of retailers and provided by a provider, the method comprising the steps of:
   a) providing, by the provider, a generically configured version of the electronic automotive diagnostic device for sale to a plurality of private label retailers separate from the provider, the electronic automotive diagnostic device provided to each of the plurality of private label retailers being substantially the same and being configured to retrieve diagnostic data from an onboard computer located on a vehicle;
   b) providing to an end user of the electronic automotive diagnostic device, after retail sale of the electronic automotive diagnostic device to the end user by the specific private label retailer of the plurality of private label retailers, a list of the plurality of private label retailers;
   c) receiving retailer data on the electronic automotive diagnostic device from an end user identifying the specific private label retailer from which the electronic automotive diagnostic device was purchased;
   d) configuring the electronic automotive diagnostic device to a branded variant thereof to display first identification indicia specifically associated with the specific private label retailer of the plurality of private label retailers to increase the end user's association with the identified specific private label retailer, in response to receipt of the retailer data;
   e) providing a customer service system including a base website with at least one database and a plurality of portals in operative communication with the at least one database, each of the plurality of portals having identification indicia associated with a respective one of the plurality of private label retailers; and
   f) configuring the customer service system by correlating the branded variant of the electronic automotive diagnostic device with one of the plurality of portals having second identification indicia associated with the identified specific private label retailer, the one of the plurality of portals including a graphical interface having an appearance of being a private label retailer website of the identified specific private label retailer and providing a unified user experience in conjunction with functionalities as modified and tailored by the specific private label retailer, in response to receipt of the retailer data.

2. The method of claim 1, wherein step b) includes displaying the list of the plurality of private label retailers on the electronic automotive diagnostic device.

3. The method of claim 1, wherein step b) includes displaying the list of the plurality of private label retailers on a computer.

4. The method of claim 1, wherein step b) includes displaying the list of the plurality of private label retailers on the base website.

5. The method of claim 1, wherein step b) includes displaying the list of the plurality of private label retailers on a kiosk.

6. The method of claim 1, wherein step c) includes receiving the retailer data from the end user via input on the electronic automotive diagnostic device.

7. The method of claim 1, wherein step c) includes receiving the retailer data from the end user via input on a computer.

8. The method of claim 1, wherein step c) includes receiving the retailer data from the end user via input on the base website.

9. The method of claim 1, wherein step c) includes receiving the retailer data from the end user via input on a kiosk.

10. The method of claim 1, further comprising the step of displaying the first identification indicia on the electronic automotive diagnostic device.

11. The method of claim 1, further comprising the step of displaying the second identification indicia on a computer.

12. The method of claim 1, further comprising the step of displaying the second identification indicia on the one of the plurality of portals of the base website.

13. The method of claim 1, further comprising the step of displaying the second identification indicia on a kiosk.

14. The method of claim 1, wherein the plurality of portals represent a plurality of customer service websites hosted by the base website and each display the identification indicia associated with the respective one of the plurality of private label retailers.

15. The method of claim 14, further comprising displaying the respective one of the plurality of customer service websites associated with the identified specific private label retailer.

16. The method of claim 14, wherein each of the plurality of customer service websites has a specific graphical interface including the identification indicia associated with the respective one of the plurality of private label retailers.

17. The method of claim 16, wherein each specific graphical interface includes a respective electronic address associated therewith.

18. The method of claim 16, further comprising displaying the specific graphical interface associated with the identified specific private label retailer on one of the plurality of customer service websites associated with the respective one of the plurality of private label retailers.

19. The method of claim 1, wherein step c) includes retrieving the retailer data from the electronic automotive diagnostic device.

20. The method of claim 1, wherein step b) includes providing a diagnostic website configured to analyze the diagnostic data retrieved from the onboard computer located on the vehicle.

21. The method of claim 20, wherein the diagnostic website includes a diagnostic database, the method further comprising the step of comparing the diagnostic data with the diagnostic database to determine a diagnostic solution.

22. The method of claim 1, further comprising the step of configuring the customer service system to display the second identification indicia associated with the specific private label retailer in response to subsequent establishment of a communication link between the electronic automotive diagnostic device and the customer service system, independent of any requirement to repeat steps b) or c).

23. The method of claim 1, wherein the electronic automotive diagnostic device has a digital display which displays the first identification indicia associated with the specific private label retailer in response to receipt of the retailer data.

24. The method of claim 23 further comprising displaying the first identification indicia associated with the specific private label retailer in response to subsequent establishment of communication between the electronic automotive diagnostic device and the customer service system, independent of any requirement to repeat steps b) or c).

25. The method of claim 1, further comprising the steps of:
generating a sale of a product on the customer service system; and
sharing income derived from the sale between the private label retailer and the provider of the electronic automotive diagnostic device.

26. The method of claim 25, wherein the step of generating the sale includes directing the end user to a website where the private label retailer markets products or services.

27. The method of claim 25, wherein the step of generating the sale includes directing the end user to a website wherein the provider markets products or services.

28. The method of claim 1, further comprising the steps of:
generating an advertising sale on the customer service system; and
sharing income derived from the advertising sale between the specific private label retailer and the provider of the electronic automotive diagnostic device.

29. A method of associating a specific private label retailer with an electronic device sold by a plurality of private label retailers, the method comprising the steps of:
a) providing a generically configured version of the electronic device for sale to the plurality of private label retailers, the electronic device provided to a first one of the plurality of retailers being substantially similar to the electronic device provided to a second one of the plurality of retailers;
b) providing an input field to an end user allowing the end user to enter retailer data identifying the specific private label retailer of the plurality of private label retailers from which the electronic device was purchased;
c) receiving the retailer data from the end user;
d) configuring the electronic device to a branded variant thereof to display first identification indicia specifically associated with the identified specific private label retailer, to increase the end user's association with the identified specific private label retailer in response to receipt of the retailer data;
e) providing a customer service system including a base website with at least one database and a plurality of portals in operative communication with the at least one database, each of the plurality of portals having identification indicia associated with a respective one of the plurality of private label retailers; and
f) configuring the customer service system by correlating the branded variant of the electronic device with one of the plurality of portals having second identification indicia associated with the identified specific private label retailer so as to display the second identification indicia specifically associated with the identified specific private label retailer, the one of the plurality of portals having an appearance of being a private label retailer website of the identified specific private label retailer and providing a unified user experience in conjunction with functionalities as modified and tailored by the specific private label retailer, in response to receipt of the retailer data.

30. A method of associating a specific private label retailer of a plurality of private label retailers with an electronic device sold by the plurality of private label retailers, the method comprising the steps of:
a) receiving retailer data on the electronic device from an end user identifying the specific private label retailer of the plurality of private label retailers from which the electronic device was purchased, the electronic device purchased by the end user being substantially the same as other electronic devices sold by other private label retailers of the plurality of private label retailers, and the retailer data being selected from a list of the plurality of private label retailers;
b) reconfiguring the electronic device to display first identification indicia specifically associated with the specific private label retailer corresponding to the received retailer data to increase the end user's association with the identified specific private label retailer, in response to receiving the retailer data; and
c) outputting from the electronic device a link to a customer service system including a based website with at least one database and a plurality of portals in operative communication with the at least one database, each of the plurality of portals having identification indicia associated with a respective one of the plurality of private label retailers, the link establishing operative communication between the electronic device and the at least one database through one of the plurality of portals having second identification indicia associated with the identified specific private label retailer to create an appearance of being on a private label retailer website of the identified specific private label retailer and provides a unified user experience in conjunction with functionalities of the electronic device as modified and tailored by the specific private label retailer.

31. The method of claim 30, wherein the retailer data is received in a data input field displayed on a computer to which the electronic device is connected.

32. The method of claim 30, wherein the retailer data is received in a data input field displayed on the electronic device.

* * * * *